United States Patent [19]

Barnes et al.

[11] 3,882,920

[45] May 13, 1975

[54] TUBE-TIRE AND RIM MOUNTING TOOL

[75] Inventors: Dwaine Ralph Barnes, Peoria; John Frederick Lindquist, Morton, both of Ill.

[73] Assignee: Caterpillar Tractor Company, Peoria, Ill.

[22] Filed: Nov. 19, 1973

[21] Appl. No.: 416,952

[52] U.S. Cl. ................... 157/1.1; 29/238; 29/252
[51] Int. Cl. .............................................. B60c 25/06
[58] Field of Search ............. 157/1.2, 1.17, 1.11, 1, 157/1.35; 29/235, 238, 252; 152/396, 402, 404; 254/89 H

[56] References Cited
UNITED STATES PATENTS

| | | | |
|---|---|---|---|
| 1,240,288 | 9/1917 | Woodward | 29/238 |
| 2,989,108 | 6/1961 | Gore | 152/404 |
| 3,289,868 | 12/1966 | Miller et al. | 254/89 H |
| 3,606,921 | 9/1971 | Grawey | 152/354 |

*Primary Examiner*—Al Lawrence Smith
*Assistant Examiner*—Harold P. Smith, Jr.
*Attorney, Agent, or Firm*—Phillips, Moore, Weissenberger Lempio & Strabala

[57] ABSTRACT

Split rim halves which fit tightly within the central aperture of a tube-tire can be mounted with the tire by partially inserting the several rim halves within the central aperture and thereafter utilizing a plurality of ram pulling devices arranged circumferentially about the inner diameter of the rim halves, which devices are independently controlled with separate controls so that they can be operated to bring the several rim halves into proper registry within the central aperture of the tube-tire. The ram pulling devices, which also provide guides to insure the holes in the several rim halves are brought into registry, can be augmented through the use of guide dowels which assist in the pre-alignment of the several rim halves.

5 Claims, 5 Drawing Figures

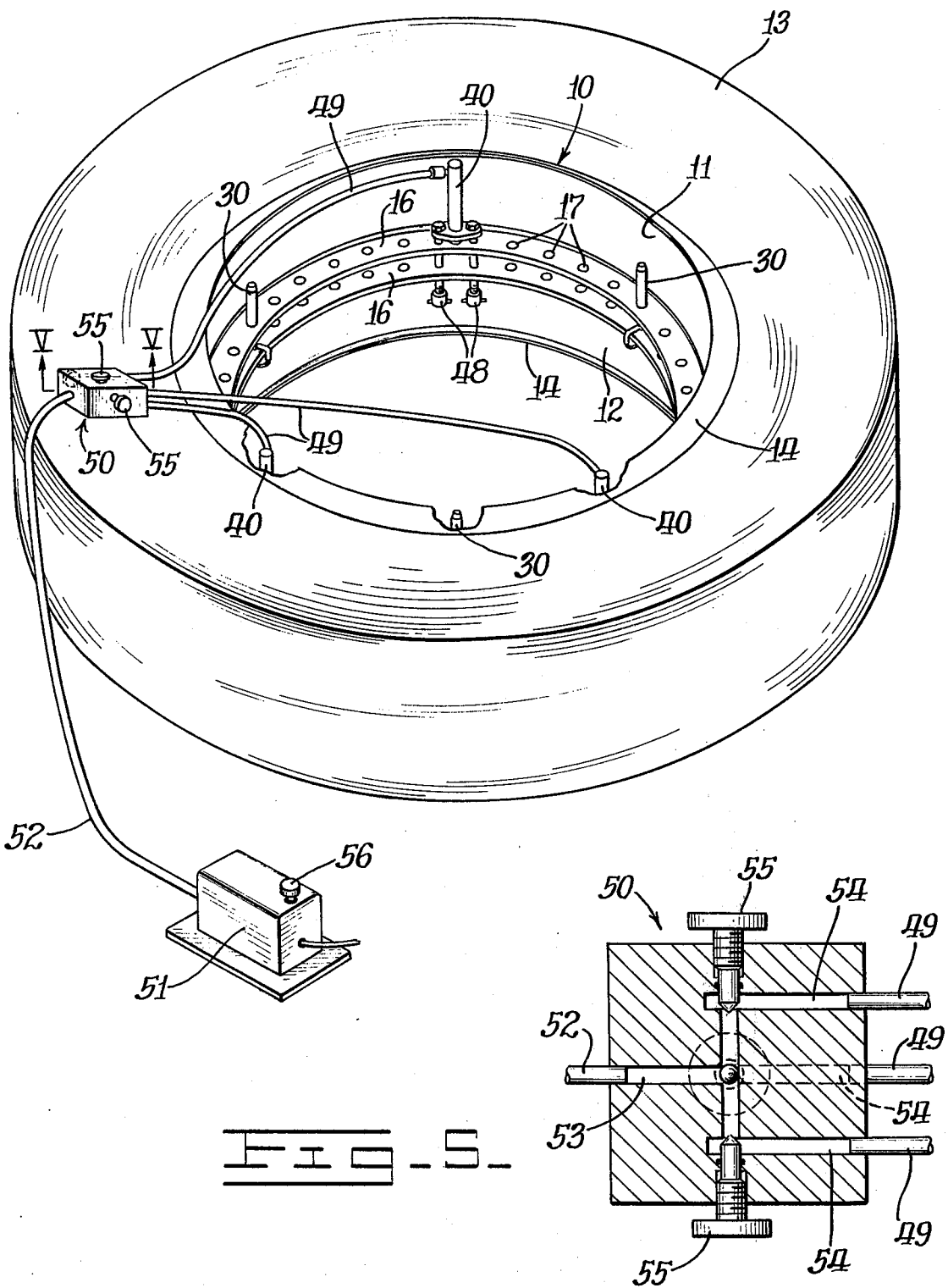

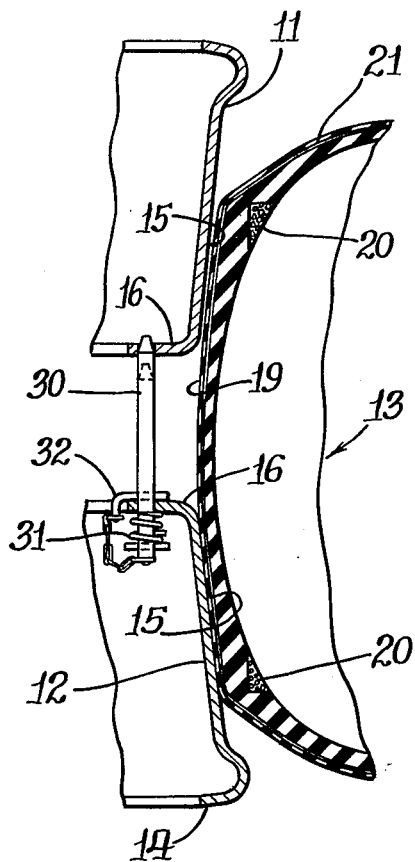
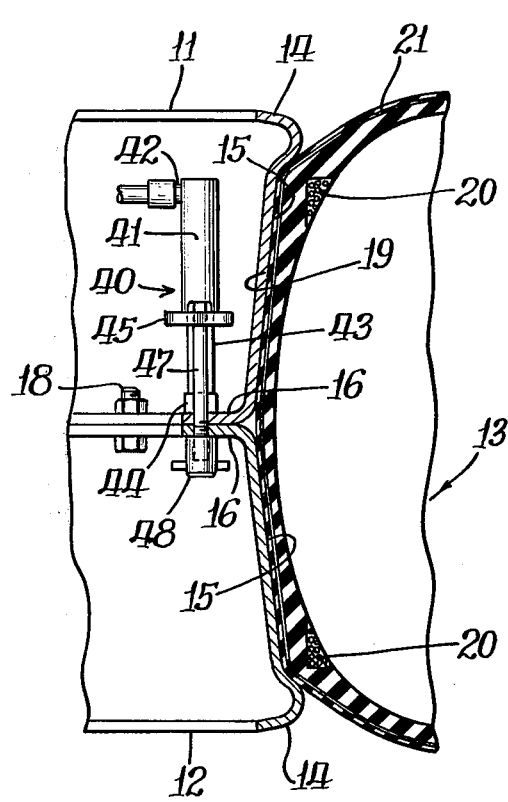
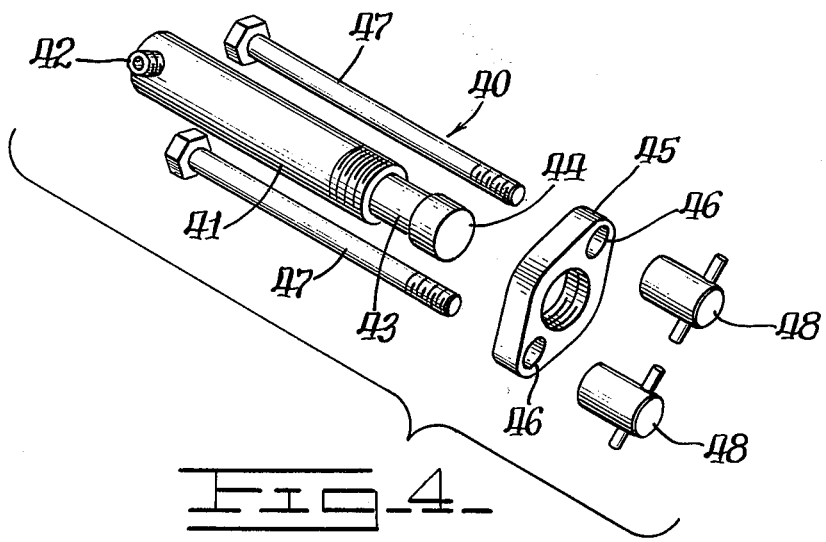

TUBE-TIRE AND RIM MOUNTING TOOL

BACKGROUND OF THE INVENTION

With the successful development of the radially reinforced multi-pressure tube-tire, as disclosed in U.S. Pat. No. 3,606,921 issued to Grawey, the mounting of the split rim structures within the central aperture of these tube-tires has proved a difficult task. Usually each cylindrical rim half which is fitted into the aperture will be conically shaped, having a larger outer diameter which tapers to a smaller inner diameter where the two rim halves are joined through their respective inwardly-directed mounting flanges. Split rim structures of the type described are disclosed in United States Patent Application Ser. No. 283,375, and also an alternate but similar split rim structure is disclosed in the above-referenced United States Patent.

It should be appreciated from the foregoing discussion that the relationship between the tube-tire and the split rim structure departs from the more conventional tire and rim structures. The conventional rim structures often are referred to as drop center rims, which usually form a part of the air chamber in tubeless tires by retaining the beads of the open center carcasses in sealing relationship against projecting radial flanges. More particularly, the split rim structures referred to herein do not utilize the conventional bead holding structures, nor do they form part of the air chamber of the tube-tire.

More particularly, a tube-tire forms its own air chamber, being a completely enclosed chamber in that it includes a rim wall which extends between the side walls. This rim wall comes into contact with the cylindrical surfaces of the rim halves when the tire and rim structure are assembled. Since there is usually a slight interference between these several surfaces, it is often extremely difficult to force the cylindrical rim halves into the central aperture of the tube-tire. Particularly, the elastomer surfaces of the tire rim wall resist the inward movement of the cylindrical rim halves, and while special lubricants can be used, those which will reduce the rim-to-tire drive once the rim has been assembled with the tire must be avoided.

Because of the high frictional coefficients between the rim wall of the tire and the surfaces of the rim structure, the rim halves must be brought together carefully to avoid severely distorting the tire rim wall, which can lead to breakage or weakening of the radial reinforcement and/or rupturing of the self-contained air chamber of the tube-tire.

As a result of these problems, it is an object of the instant invention to provide a rim tool that can safely draw the several rim halves of a split rim structure together in the central aperture of a tube-tire without injuring the tube-tire, even when there is an interference fit between these several components.

A further object of the instant invention is to provide a relatively inexpensive tool for assembling split rims with tube tires in the field which is generally easy to operate and convenient to use.

SUMMARY OF THE INVENTION

The above objects and other advantages can be accomplished with a tube-tire includes a plurality of ram pullers, each having a cylinder ram and with a cross head connected to its cylinder, along with several pull rods which are associated with each cross head to mechanically connect the cross head to a rim half remote from the cross head when the cross head is positioned one rim half of the split rim halves and a control unit connected to each of the cylinders of the several pullers through separate connections with separate control devices within the control unit to independently operate the cylinders so the several rim halves of the split rim will be closed together while maintaining a substantially parallel relationship by independent actuation of the several ram pullers which are circumferentially disposed around the several rim halves.

BRIEF DESCRIPTION OF THE DRAWINGS

FIG. 1 is a perspective illustrating the rim tool associated in assembling a tube-tire with its associated split rim halves;

FIG. 2 is a section through one side of the tire and rim structure illustrated in FIG. 1 with parts broken away to illustrate the initial relationships between the tube-tire and the several rim halves, and which also shows a guide dowel for insuring registry of coupling holes in the several rim halves;

FIG. 3 is a section similar to that shown in FIG. 2 but with the split rim halves illustrated therein drawn into their final registry, and which also shows one of the ram pulling devices which is utilized to bring these rim halves into the illustrated registry;

FIG. 4 is an exploded perspective of the ram pulling device shown in FIG. 3; and FIG. 5 is a cross-section of the valve control unit shown in FIG. 1 along lines V—V used for operating the ram pulling devices.

DESCRIPTION OF THE PREFERRED EMBODIMENT

Referring to FIG. 1, a split rim 10 having two symmetrical rim halves 11 and 12 is shown partially assembled with a tube-tire 13. The tube-tire shown in outline is essentially identical to that disclosed in U.S. Pat. No. 3,606,921 mentioned above, and the description of the particular tube-tire in the referenced patent is incorporated herein by reference.

Cylindrical rim halves 11 and 12 can be identical as illustrated, and normally will include a strengthening rolled outer edge 14 where the diameter of the cylindrical rim structure is the greatest, and a tapering cylindrical rim wall 15 that extends to an inwardly directed mounting flange 16 where the diameter of the cylindrical rim half is the smallest. The conical taper between the outer diameter and inner diameter can vary between 2° and 6° as desired. A plurality of bolt holes 17 are formed in the inwardly directed mounting flanges, and once the flanges have been pulled into contiguous relationship, bolts 18 can be utilized to retain these flanges. Also, since there is essentially no outwardly directed drive on the rim halves once they have been properly assembled with the tube tire, bolts 18 can be removed thereafter (with the tube-tire at several psi) and the holes 17 can be utilized to bolt the entire tire and rim assembly to a hub assembly (not shown). Alternatively four or five bolts 18 may be utilized as keeper bolts and not utilized to connect the rim to a hub assembly, which is then modified to provide space for these bolts in the hub assembly.

As can best be seen in FIG. 2, the cylindrical rim walls 15 of the rim halves 11 and 12 engage the cylindrical tire rim wall 19 of the tube-tire 13. Because of the interference fit (the diameters of the central aperture of the tube-tire being undersized in relationship to the cylindrical rim surfaces 15 of the several rim halves) and the high coefficient of friction between the elastomer rim wall of the tire and the surfaces of the rim halves, the rim halves do not readily slip into this central aperture. In addition, it is normal practice in these types of tube-tires to utilize roll restraining hoops 20 that are fabricated slightly undersize with respect to their final location on the rim wall of the particular rim half, so that they will tend to seal out dirt and grime from the area between these roll restraining hoops by compressing the elastomer between their inner diameter and the rim half. As a result, these roll restraining hoops, which stabilize the tube-tire laterally, resist the insertion of the several rim halves. Because of these relationships, it is often very difficult to bring the several rim flanges of the two rim halves together. Even the weight of the tube-tire, when supported on one of the rim halves, is not usually sufficient to bring the tire into its proper relationship with the rim half on which it is resting.

Because of these factors, it is necessary to use considerable force to bring the rim halves 11 and 12 together so that their flanges 16 are in abutting relationship. However, when this force is exerted on the rim halves, it must be applied in a controlled manner so that the rim wall 19 of the tire will not be distorted in a manner to damage the radial reinforcing 21 of the tube-tire or effect a rupture thereof.

To achieve the proper and controlled closure of flanges 16 of the rim halves 11 and 12 when mounting them in the central aperture of the tube-tire 13, rim half 12 is usually supported on the ground with its mounting flange up. Thereafter, tube-tire 13 is placed on this rim half and allowed to settle thereon, after which rim half 11 is lowered into the central aperture of the tube-tire with its mounting flange down. In order to insure proper registry of the holes 17 in the several rim flanges, a dowel guide 30 can be inserted from beneath the mounting flange of the rim half 12 through one of the holes 17. Thereafter a spring 31 retained on the distal end of the dowel with a pin can be compressed as the dowel is forced upwardly, and thereafter a lock pin 32 inserted in a hole in the dowel above the flange to hold the dowel pin in place. With the guide dowel positioned as shown in FIG. 2, holes 17 of rim half 11 can be brought into proper registry with the holes on rim half 12 as rim half 11 is lowered into the central aperture of the tube-tire. This is required since it is extremely difficult to rotate either rim half once they contact the rim wall 19 of the tube-tire. Further, valve stems (not shown) are received in apertures of the rim wall structure and also must be maintained in proper alignment with these apertures. One or more of these guide dowels can be employed, and three are shown in FIG. 1. In addition, one of the guide dowels can be somewhat longer than the other two, if desired, in order to facilitate bringing the several rim halves into proper registry with respect to their holes 17.

Under the above-described situation, the relationship between the tube-tire and two rim halves is best represented in FIG. 2. At this time a plurality of ram pullers 40 are connected to the rim flanges 16 so that they are circumferentially disposed in an approximate equidistant relationship as shown in FIG. 1.

Since the ram pullers 40 are all identical and all are attached in an identical manner, only one of the ram pullers is described herein, and the description for its attachment is the same for the others as well.

Referring to FIG. 3, it can be seen that each ram puller 40 consists of a hydraulic cylinder 41 having an inlet-outlet fitting 42 at its closed end and a projecting ram 43 with an integral foot 44. A cross head 45 is attached to the hydraulic cylinder at its ram end (such as with the threaded connection as shown) and includes a pair of diametrically spaced holes 46 which register with two of the adjacent holes 17 in the rim flanges 16 when the cross head is located on one of the flanges 16. As a result, pull rods 47 can be inserted through holes 46 and then through holes 17 in the several rim flanges so that their threaded ends project beneath the flange of rim half 12. This arrangement will mount the ram puller in the manner shown in FIG. 1, and thereafter wing caps 48 can be spun onto the threaded projecting ends of the pull rods.

Each of the ram pullers are attached in the same manner and are connected by a separate flexible hydraulic hose 49 to a valve control unit 50 which is in turn connected to a hydraulic pump and reservoir unit 51 by flexible hydraulic hose 52. Usually the pump and reservoir unit is electrically powered and delivers a positive pressure approximately 2,500 to 4,500 psi to the control unit 50.

The control unit 50, whown in section in FIG. 5, includes an inlet 53 and three separate outlets 54 with each outlet controlled by a separate valve 55. Thus, when the ram pullers 40 are installed as shown in FIG. 1, each ram puller can be operated independently to insure that the several flanges 16 are maintained in a substantially parallel relationship as they are closed together due to the hydraulic extensions of the rams and the engagement of the foot 44 against the mounting flange 16 of the rim half 11.

As the rim flanges 16 are brought into approximate closure, pins 32 of the several guide dowels can be removed so that complete closure of the rim flanges (as shown in FIG. 3) can be achieved. Thereafter, bolts 18 can be inserted and their nuts tightened thereon to cinch the mounting flanges in their closed position.

To retract the rims of the several pullers once the bolts 18 have been inserted to hold the flanges 16 together, the pump may be reversed with the control 56 and valves 55 opened so that the hydraulic fluid is extracted from cylinders 41 of the several pullers, thereby releasing the tension on the pull rods 47. Subsequent thereto, the wing caps can be removed from the treaded ends of the pull rods and the units removed from the flanges. It is to be appreciated that the wing caps have a blind bore and when assembled, are spun onto the treaded end of the pull rod until the bolt bottoms in the cap. In this manner, the equal length of the several pull rods on each of the pullers is insured.

Because a relatively high coefficient of friction exists between the rubber forming the rim wall of the tire and the rim surface, a lubricant can be employed to facilitate the assembly of the tube-tire and the rim halves. Conventional lubricants such as those now used in the tire arts can be employed between these surfaces.

We claim:
1. A tube-tire rim mounting tool for parallel closure of split rim halves used with tube-tires comprising:

a plurality of ram pullers, each having a ram and a cylinder with a connected cross head means;

pull rods connected to each cross head means operable to mechanically connect said cross head when it is adjacent to one rim flange to a rim flange remote from said cross head;

a control unit connected through separate connections to each of said cylinders, said control unit including separate control means operable to independently control each of said cylinders; and a source of power for said cylinders connected to said control unit whereby said separate control means can be independently employed to control the several said rams in a manner that several rim flanges of a split rim to which the ram pullers are attached can be closed while maintaining a substantially parallel relationship.

2. A tube-tire rim mounting tool as defined in claim 1 wherein the pull rods are removable from the cross head means and include quick disconnect means on at least one end thereof.

3. A tube-tire rim mounting tool as defined in claim 1 wherein each of the cylinders of the several ram pullers is a hydraulic cylinder.

4. The tube-tire rim mounting tool defined in claim 3 wherein the source of power is a source of hydraulic fluid under pressure and the separate control means include valves operable to independently operate the several cylinders.

5. The tube-tire rim mounting tool as defined in claim 1 wherein the source of power provides hydraulic fluid under pressure from 2,500 to 4,500 psi.

* * * * *

UNITED STATES PATENT OFFICE
CERTIFICATE OF CORRECTION

PATENT NO. : 3,882,920
DATED : May 13, 1975
INVENTOR(S) : Dwaine R. Barnes, et al It is certified that error appears in the above-identified patent and that said Letters Patent are hereby corrected as shown below:

On the Title Page, Item [73], change the spelling of the assignee's corporate name from "Caterpillar Tractor Company" to ---Caterpillar Tractor Co.---.

Signed and Sealed this twenty-eight Day of October 1975

[SEAL]

Attest:

RUTH C. MASON
*Attesting Officer*

C. MARSHALL DANN
*Commissioner of Patents and Trademarks*